US006101114A

United States Patent [19]

Kijima et al.

[11] Patent Number: 6,101,114

[45] Date of Patent: Aug. 8, 2000

[54] POWER CONVERSION SYSTEM HAVING MULTI-CHIP PACKAGES

[75] Inventors: Kenji Kijima, Tokyo; Ichiro Omura, Kanagawa-ken; Suzuo Saito, Saitama-ken, all of Japan

[73] Assignee: Kabushiki Kaisha Toshiba, Kawasaki, Japan

[21] Appl. No.: 09/350,912

[22] Filed: Jul. 12, 1999

[30] Foreign Application Priority Data

Aug. 4, 1998 [JP] Japan ................................ 10-220304

[51] Int. Cl.[7] .......................... H02M 7/5387; H02M 7/68

[52] U.S. Cl. ............................ 363/132; 363/98; 363/141

[58] Field of Search ................................ 363/16, 17, 50, 363/58, 98, 95, 131, 132, 141

[56] References Cited

U.S. PATENT DOCUMENTS

| | | | |
|---|---|---|---|
| 5,155,675 | 10/1992 | Maruyama et al. | 363/98 |
| 5,321,599 | 6/1994 | Tanamachi et al. | 363/41 |
| 5,361,196 | 11/1994 | Tanamachi et al. | 363/41 |
| 5,459,655 | 10/1995 | Mori et al. | 363/132 |
| 5,506,765 | 4/1996 | Nakata et al. | 363/98 |
| 5,615,102 | 3/1997 | Daijo | 363/132 |
| 5,617,308 | 4/1997 | Weise et al. | 363/98 |
| 5,623,399 | 4/1997 | Ishii et al. | 363/132 |
| 5,731,970 | 3/1998 | Mori et al. | 363/132 |
| 5,801,936 | 9/1998 | Mori et al. | 363/132 |
| 5,811,878 | 9/1998 | Harmoinen et al. | 257/723 |
| 5,910,892 | 6/1999 | Lyons et al. | 363/98 |
| 5,953,222 | 9/1999 | Mizutani | 363/56 |

FOREIGN PATENT DOCUMENTS 10-164857 6/1998 Japan .

*Primary Examiner*—Peter S. Wong
*Assistant Examiner*—Bao Q. Vu
*Attorney, Agent, or Firm*—Oblon, Spivak, McClelland, Maier & Neustadt, P.C.

[57] ABSTRACT

A power conversion system that is capable of achieving low inductance, improving cooling performance and making the external shape of the entire system small, is achieved by combining a plurality of single phase inverter units. The inverter units include four device packages each of which is composed of four packaged power devices, two neutral point clamp diodes, two by-pass diode packages and clamp diode packages. Each by-pass diode packages is composed of two packaged by-pass diodes. The clamp diode packages are composed of packaged clamp diodes. The by-pass diode packages are provided on one of the wall surfaces of the clamp diode package, and the device packages are provided on an outside wall surface of the by-pass diode package.

19 Claims, 11 Drawing Sheets

POWER CONVERSION SYSTEM HAVING MULTI-CHIP PACKAGES

BACKGROUND OF THE INVENTION

1. Field of the Invention

The present invention relates to a neutral point clamped power conversion system comprising a plurality of power devices such as IGBT (Insulated Gate Bipolar Transistor), IEGT (Injection Enhanced Gate Transistor) etc. and a plurality of clamp diodes.

2. Description of the Related Art

The main circuit of a power conversion system that converts electric power at high performance and efficiency is composed of a combination of a plurality of such power devices as IGBT capable of the high speed switching. However, with the needs arising for large capacity and high performance, a tendency to large-sized systems is unavoidable and from the restriction of availability of space for system installation, etc., the down-sizing of system is demanded at present.

This type of power conversion systems so far available will be described below. FIG. 15 is a block diagram showing the main circuit of a conventional power conversion system and FIG. 16 is a perspective view showing its schematic structure. In FIG. 15, an IGBT 101 and a by-pass diode 102 are mounted on a metallic plate 104 via an insulating plate 103, respectively and further, they are housed in an envelope 105, thus composing an IGBT module.

FIG. 16 shows the state where three units of IGBT module are provided. These modules are connected in parallel by copper made wiring conductors 106, 107. To these wiring conductors 106, 107, a snubber circuit comprising a diode module housing a snubber diode 108 in an envelope 109 and a snubber capacitor 110 are connected.

Further, a gate circuit 111 to supply a gate signal to the IGBT 101 and a protective circuit 112 to perform the protective operation by detecting voltage and current are connected to the IGBT module by way of conductors.

The IGBT module thus constructed as shown above is provided with a cooling device 103 on the surface of the metallic plate 104 and suppresses temperature rise by radiating heat generated on the IGBT 101 and the by-pass diode 102.

However, a conventional power conversion system described above has such problems as shown below. That is, there are such problems that a number of component parts are required for the modules and peripheral circuits and a more large space must be secured to house them.

In other words, (1) As the modules and their peripheral circuits are composed of many parts, it becomes difficult to improve reliability of the power conversion system and further, it becomes difficult to make the external size of the entire system small.

(2) As a result of modules becoming large in size, the lengths of the wiring routes from a smoothing capacitor to supply current to the modules become long, surge voltage increases and the capacity of a snubber capacitor that is used to suppress surge voltage must be increased.

(3) When increasing the number of modules connected in parallel in order to cope with the increased capacity, the current unbalance between modules also becomes large and therefore, current to be applied to each module must be restricted so as not to exceed a designed upper limit value.

(4) To fully radiate heat generated from the power devices and diodes, the capacity of a cooler must be made large.

SUMMARY OF THE INVENTION

The present invention has been made to remove the above-mentioned problems and it is an object to provide a power conversion system capable of making the wiring routes from the DC and neutral point terminals to the power device chips short, lowering inductance, making an unbalanced current between power device chips small, improving cooling performance and making the external size of the entire system small.

In order to achieve the above-mentioned object, the power conversion system according to present invention is comprising a combination of a plurality of single phase inverter units, capable of obtaining 3 levels of AC output, wherein the inverter units are equipped with a device series circuit comprising first fourth semiconductor power devices connected in series, DC terminals connected to both ends of the device series circuit, a by-pass diode circuit comprising by-pass diodes connected in series each other and to the power devices of the device series circuit in parallel, a series circuit comprising first and second clamp diodes connected to a series circuit comprising the second and third power devices in parallel, a neutral point terminal connected to a connecting point of the first and the second clamp diodes and an AC terminal connected to the connecting point of the second and the third power devices, and is characterized in that first, second, third and fourth device packages composed of packaged power device chips, clamp diode packages composed of the packaged two pieces of neutral point clamp diode chips, first and second by-pass diode packages composed of the packaged first and second by-pass diode chips and third and fourth by-pass diode chips, the first and second by-pass diode packages provided in parallel on one of the wall surface of the clamp diode package and the first and second device packages and third and fourth device packages provided in parallel on the outsides wall surface of the by-pass diode package.

Further, the power conversion system according to the invention includes a combination of a plurality of inverter units for single phase, capable of obtaining 2 levels of AC output, wherein the inverter units are equipped with a device series circuit comprising first and second semiconductor power devices connected in series, DC terminals connected to both ends of the device series circuit, a clamp diode series circuit composed of clamp diodes connected to the power devices of the device series circuit in parallel and an AC terminal connected to the connecting point of the first and second power devices, and is characterized in that first and second device packages composed of the packaged power device chips, clamp diode packages composed of the packaged clamp diode chips and the first and second device packages are provided in parallel on one of the wall surfaces of the clamp diode package.

According to the invention, it is possible to make the wiring routes from the DC terminals, neutral point terminal to the power device chips short, current unbalance between power device chips small and the external shape of the entire system small.

In this invention,it is characterized in that the device package is composed of an insulated wiring board that has a wiring pattern on which are installed the collector of the device chip, a base on the insulated wiring board, bulk electrodes on the emitter of the device chip, an emitter beam lead arranged on the bulk electrodes, a collector beam lead connected to a wiring pattern in the insulated wiring board, a gate board covering on the emitter beam lead with penetrating holes formed to penetrate a plurality of gate leads, and a case housing these components.

According to the above mentioned invention it is possible to make the external shape of the device package small.

Further, it is desirable that the circumferences of the device chips are sealed with insulating molded resin.

According to this, insulation around the device chips is improved, thus making the devices compact in size and the devices can be protected fully.

In the invention, it is characterized in that the by-pass diode package is composed of an insulated wiring board having a wiring pattern on which are installed the by-pass diode chips, a base on the insulated wiring board, bulk electrodes on the by-pass diode chips, a beam lead arranged on the bulk electrodes and connected to the by-pass diode chips, and a case housing these components.

According to this, the external shape of the by-pass diode package can be made small. The by-pass diode package may be composed of one set of two pieces of by-pass diode chips.

Further, it is desirable that the circumferences of the by-pass diode chips are sealed by insulating molded resin.

According to the invention, it is desirable that the power device packages be installed and fixed orthogonally to the by-pass diode packages, and the clamp diode packages are installed and fixed orthogonally to the by-pass diode packages. The power device and clamp diode packages are put on a cooler that is formed in one united body of an air-cooled radiator and a heat pipe.

According to this, cooling performance of the power devices and by-pass diodes is improved.

Further, according to the invention it is desirable that an insulator is provided against one end side of the two DC terminals of plates, the neutral point terminal is provided between the DC terminals at the other end side of the DC terminals, snubber capacitors comprising a snubber circuit are provided between one of the DC terminals and the neural point terminal and between the neutral point terminal and the other DC terminal, the clamp diode package and the by-pass diode package are installed to the cooler and the clamp diodes and the by-pass diodes are electrically and mechanically connected to the DC terminals and the neutral point terminal, respectively.

According to the structure, the entirety of snubber capacitors, DC terminals and neutral point terminal can be formed in a compact size and cooling performance of the clamp diodes and by-pass diodes is improved.

Further, according to the invention it is desirable that the inverter units are mounted on both side surfaces of a heat pipe comprising a cooler, and the electrical connection of the inverter units are made by penetrating the heat pipe.

Accordingly, the structure improves the cooling performance of a power conversion system and enables it to make the system compact in size.

Further, if device packages and clamp diode packages are arranged and fixed so that they become orthogonal to each other, the wiring routes of the power devices and the clamp diodes become short and it becomes possible to achieve low inductance.

DETAILED DESCRIPTION OF THE PREFERRED EMBODIMENTS

Figure 1:
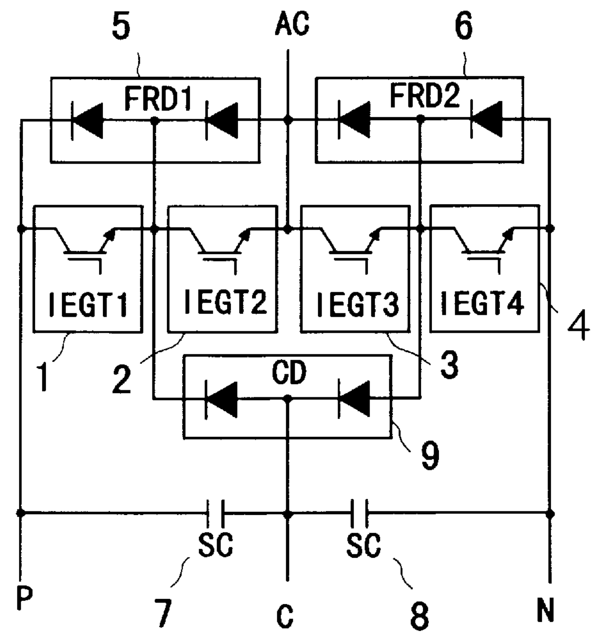
FIG. 1 is a schematic block diagram showing a neutral point inverter unit for one phase for explaining the first embodiment of the present invention.
Figure 2:
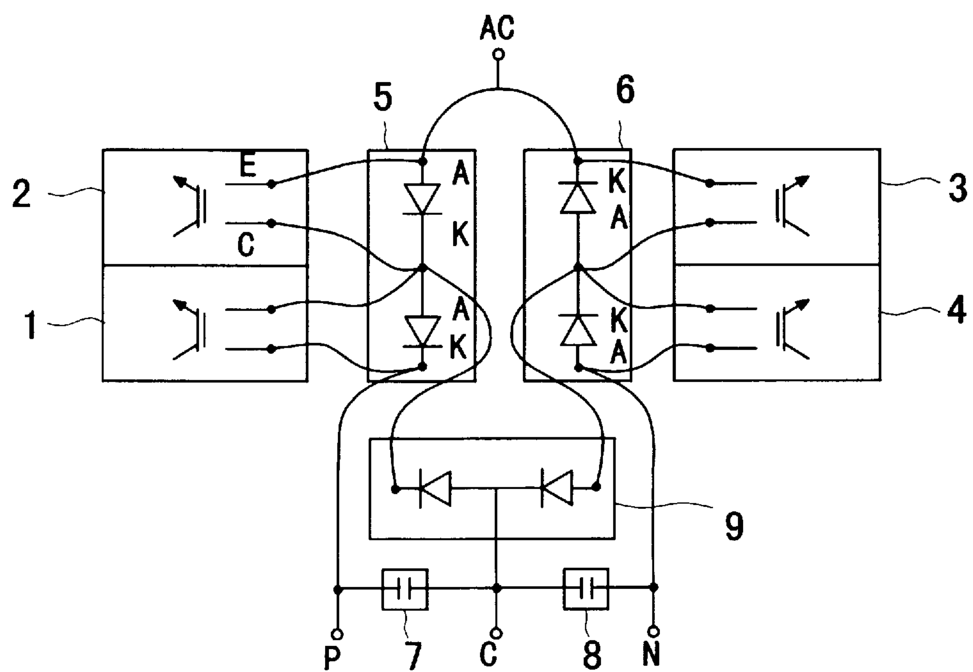
FIG. 2 is a diagram showing the relation between the arrangement and electrical connection of the package shown in FIG. 1.

FIG. 1 is a schematic block diagram showing a single phase inverter unit of the neutral point clamped system (a system to obtain 3 levels of AC output) for explaining a first embodiment, and FIG. 2 is a diagram showing the electrical connection relation with the package arrangement shown in FIG. 1.

In the inverter unit for single phase, the first ~ fourth semiconductor power devices (IEGT1 ~ IEGT4) 1, 2, 3, 4 are sequentially arranged and a device series circuit with the emitters and collectors of these adjacent devices connected in series is provided.

And DC terminals P and N connected to both ends of the device series circuit, a by-pass diode circuit with by-pass diodes (FRD1, FRD2) 5, 6 connected to the power devices 1~4 of the device series circuit in parallel, and the by-pass diodes 5, 6 connected in series, a series circuit of first and second clamp diodes (CD) 9 connected to the series circuit of the second and third power devices in parallel, a neutral point terminal C connected to the connecting point of the first and the second clamp diodes and an AC terminal connected to the connecting point of the second and the third power devices 2, 3 are provided.

Definitely, each of the power devices 1~4 is composed of power device chips, emitter terminals, collector terminals and gate terminals electrically connected to each chip and a case containing these parts. There are first, second, third and fourth packages with molded resin filled in each case. Further, the first and the second by-pass diodes and the third and fourth by-pass diodes are composed of the first and the second by-pass diode packages that are packed with diode chips and molded resin filled in a case.

Further, each of two neutral point clamp diodes 9 is composed of a clamp diode package that are packaged with diode chips and molded resin filled in a case.

And on one of the wall surface of a clamp diode package, the first and second by-pass diode packages are provided in parallel and on the outside wall surfaces of the by-pass diode packages, the first and the second, and the third and the fourth device packages are provided in parallel. Further, between the DC terminal P and the neutral point terminal C and between the DC terminal N and the neutral point terminal C, the snubber capacitors (SC) 7 and 8 are connected, respectively.

An inverter capable of obtaining 3 levels of AC output is composed of a combination of a plurality of, for instance, 3 units of an inverter unit for single phase thus composed.

According to the above-mentioned first embodiment, the wiring routes connecting the power devices 1~4, the by-pass diodes 5, 6, the clamp diodes 9, the snubber capacitors 7, 8 become short and as a result, low inductance becomes possible and a current unbalance between the power devices 1~4 can be made small.

Further, as the power conversion system is composed by arranging the power device packages, clamp diode packages and by-pass diode packages as shown in FIG. 2, the external shape of the entire system can be made small.

Figure 3A:
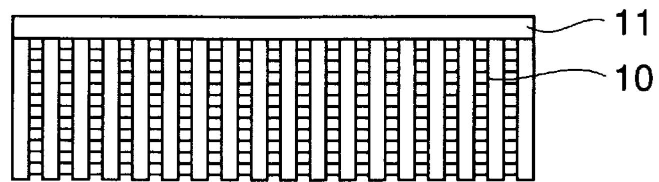
FIG. 3*a* shows a plan view of an inverter unit for one phase in the structure shown in FIGS. 1 and 2 installed to an air cooled cooler.
Figure 3B:
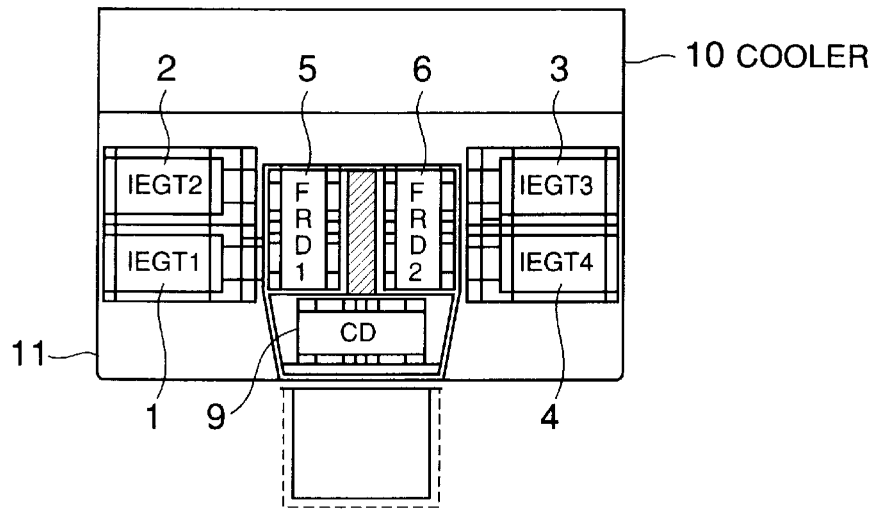
FIG. 3*b* shows a front view of an inverter unit for one phase in the structure shown in FIGS. 1 and 2 installed to the air cooler.
Figure 3C:
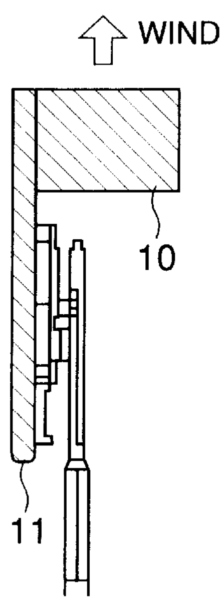
FIG. 3*c* shows a side view of an inverter unit for one phase in the structure shown in FIGS. 1 and 2 installed to the air cooler.

FIG. 3 shows an example of mounting an inverter unit for single phase constructed as shown in FIG. 1 and FIG. 2 to an air cooled cooler, (a) is its plan view, (b) is a front view and (c) is a side view. That is, on a cooler formed with an air-cool radiator (i.e., a heat sink) 10 and a heat pipe 11 in one unit, the device packages are installed and fixed orthogonally to the by-pass diode packages and the clamp diode packages are installed and fixed orthogonally to the by-pass diode packages.

According to the second embodiment constructed as described above, it is possible to down size a cooler.

Figure 4A:
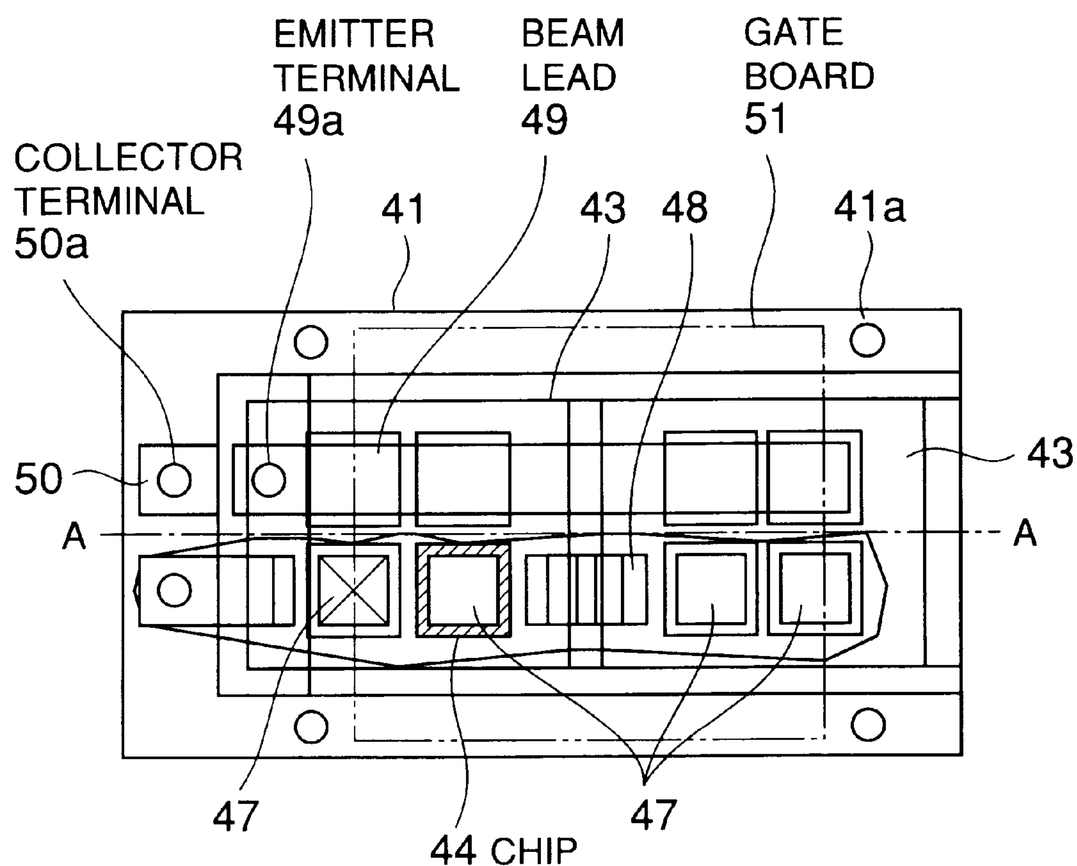
FIG. 4*a* shows a plan view of the actual structure of the device package shown in FIG. 1 and FIG. 2.
Figure 4B:
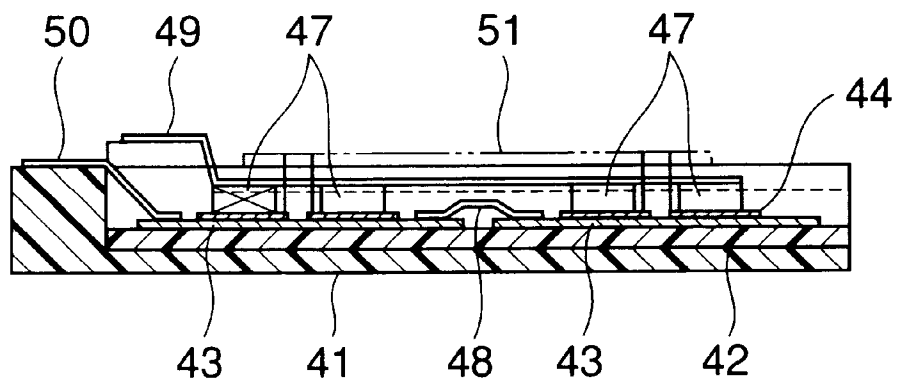
FIG. 4*b* shows a front sectional view of the actual structure of the device package shown in FIG. 1 and FIG. 2.
Figure 5:
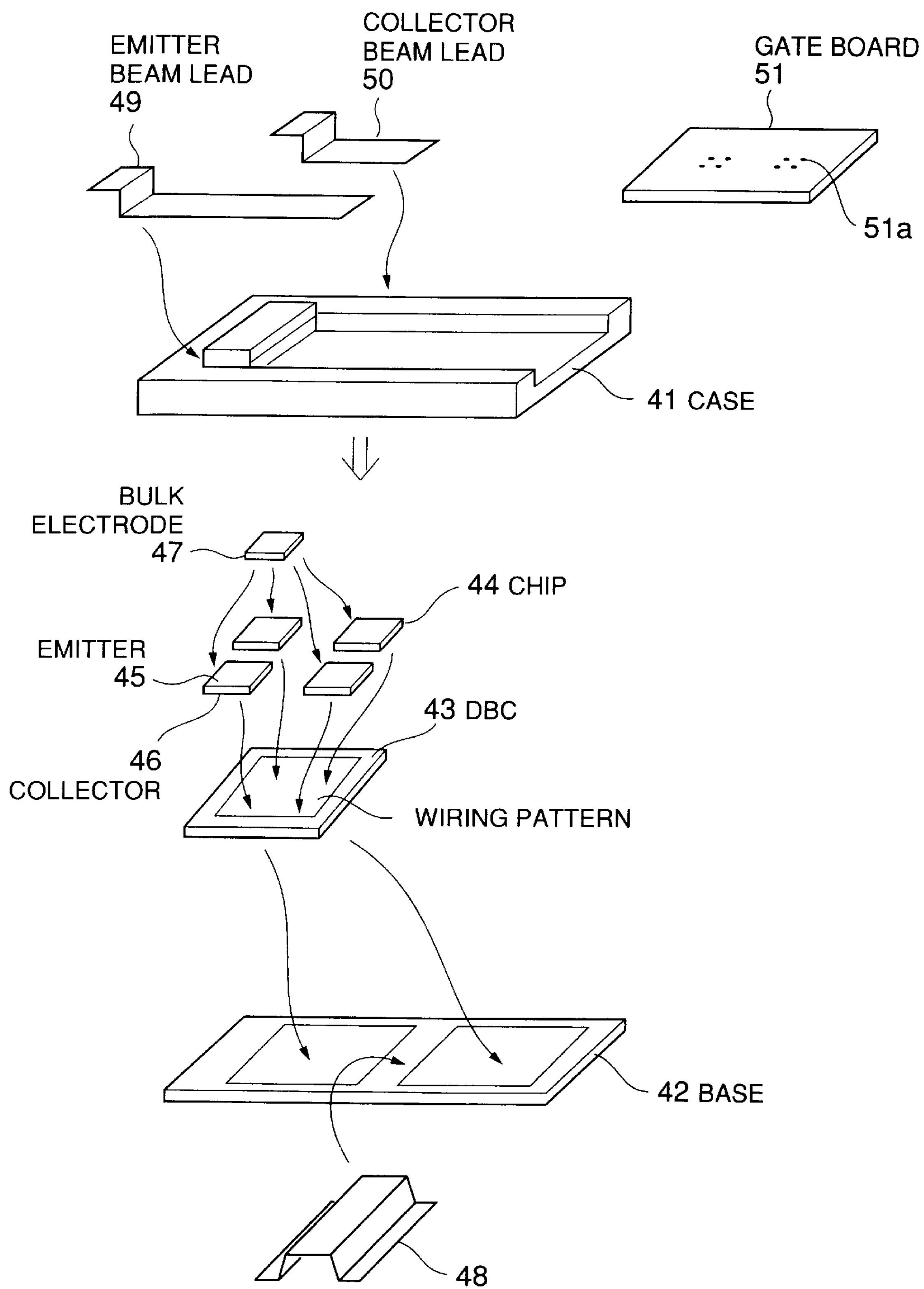
FIG. 5 is an exploded perspective view of the device package shown in FIG. 4.

FIG. 4 is a diagram for explaining the actual structure of a power device package that is composed of, for instance, only the power devices 1, 2 of the power devices 1~4 shown in FIG. 1 and FIG. 2 and (a) is a plan view and (b) is a front sectional view of the package that is cut in the direction of paper surface along the line A—A of (a), and FIG. 5 is a exploded perspective view of FIG. 4. A base 42 is housed in the recess in a case 41, two sheets of high voltage resisting DBC boards (i.e., ceramic wiring plates) 43 made aluminum nitride formed a wiring pattern are installed on a base 42, and, four block shaped device chips 44 comprising the power devices 1 and 2 shown in FIG. 1 and FIG. 2 are installed on each DBC board 43,so as to have emitter 45 opposite and collector 46 directly against the DBC board side, block shaped bulk electrodes 47 are installed and soldered on the emitter of each device chip 44 respectively and wiring pattern connectors 48 are put between two DBC boards to electrically connect the wiring patterns on both DBC boards. On each of the block shaped bulk electrodes 47 on which these parts are arranged, an emitter beam lead 49 are arranged and a collector beam lead 50 are arranged and connected to the wiring pattern in the DBC board 43, a gate board 51 with penetrating holes 51*a* formed for penetrating a plurality of wires is installed on the beam leads 49.

The sorundings of the chips 44 in the housing recess of the case 41 are filled with molded resin made of epoxy resin or ceramics and the entire package is made in the highly voltage resisting and airtight sealed structure.

As a material to solder the emitter 45 on the upper surface of the device chip 44, the collector 46 on the lower surface of the device chip 44, and the bulk electrode 47 to the emitter 45, a cladding material with Mo and Cu that is close to thermal expansion of the device chip 44 is used. Further, 4 package mounting holes 41*a* are formed on the case 41.

According to the third embodiment, actions and effects shown below are obtained. Because bulk electrode 47 are soldered to the emitter 45 of the device chip 44, and collector 46 are soldered on the wiring pattern of the DBC board, it becomes possible to achieve the low inductance and further, improve the cooling effect.

For the emitter beam lead 49 and the collector beam lead 50 of which one end is bent in the L-shape to connect the device chips, a flexible lead is used and the bent portions of the beam leads 49, 50 are fixed to the stepped portion provided in the housing recess of the case 41 by welding or soldering. 49*a* is an emitter terminal and 50*a* is a collector terminal.

The beam leads 49, 50 are able not only to make inductance low but also suppress the thermal expansion, for instance, by fixing material of Cu system through welding or soldering, or using cladding material of Cu and Co.

Further, because the gate board 51 having the penetrating holes 51*a* on the emitter beam leads 49 upper side of the device chips 44 is provided and gate leads are installed using the penetrating holes 51*a*, the gate leads can be made in the shortest length, and it is possible to make inductance low.

Further, as the groove around the device chips 44 are sealed by molding epoxy resin, etc., the devices 44 and the DBC board 43 are reinforced. For the sealing method of the device chips 44, either method described in FIG. 11 or FIG. 12 can be used.

Further, the case 41 shown in FIG. 5 maybe thin package type, if the base 42 is sufficiently strong, it can be of less package type not provided case 41.

Figure 6A:
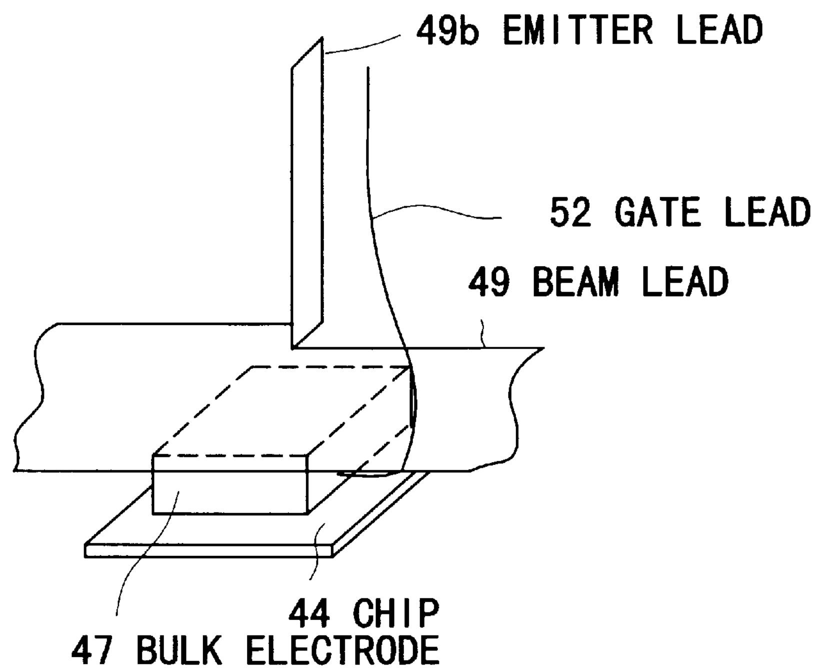
FIG. 6*a* is a first example for explaining the gate wiring shown in FIG. 1 and FIG. 2.
Figure 6B:
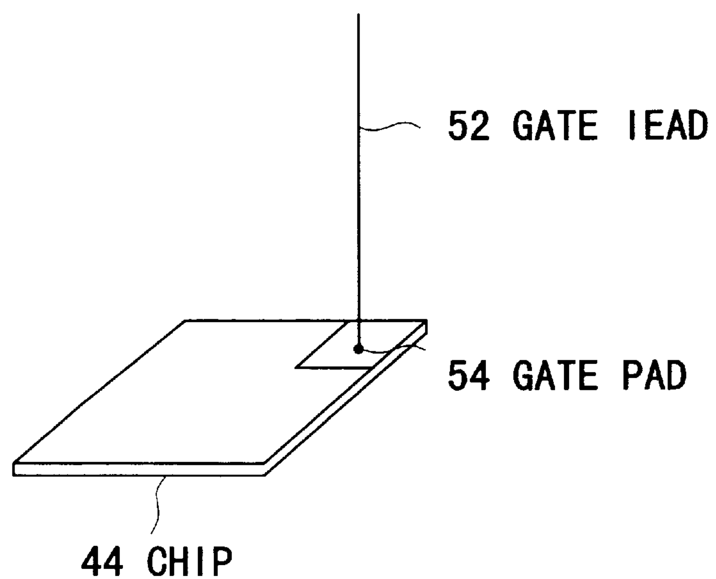
FIG. 6*b* is a second example for explaining the gate wiring shown in FIG. 1 and FIG. 2.

FIG. 6 is a diagram for explaining the structures of the emitter terminal and the gate terminal and (a), (b) is a first example and a second example, respectively. In FIG. 6(*a*), the beam lead 49 is partially cut, the cut piece is bent to form an emitter lead 49*b* and the beam lead 49 is put on the bulk electrode 47 on the device chip 44 and a line shape gate lead 52 is fixed on a gate pad (not shown) of the device chips 44. FIG. 6(B) is the line shape gate lead 52 fixed on a gate pad 54 of the device chip 44.

The gate leads 52 in this structure are all penetrated through the penetrating holes 51*a* on the gate board 51.

By constructing an emitter lead 49*b* using a flexible beam lead 49, the wiring route can be made shorter than that when ordinary lead wires are used and therefore, it is possible to make inductance low.

Figure 7A:
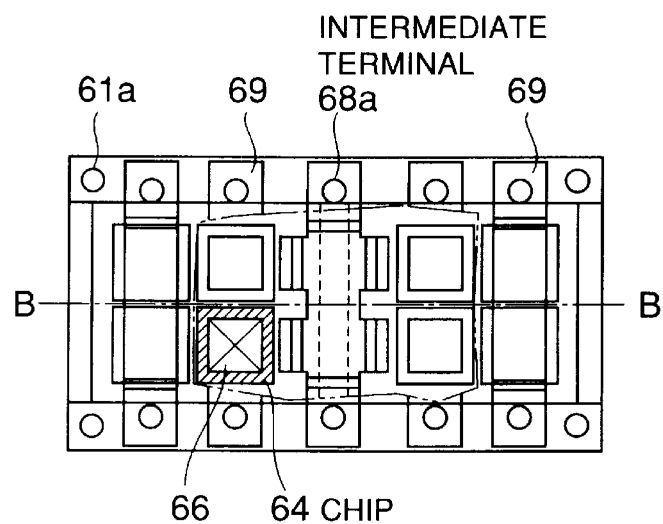
FIG. 7*a* is a plan view diagram of the actual structure of the by-pass diode package shown in FIG. 1 and FIG. 2.
Figure 7B:
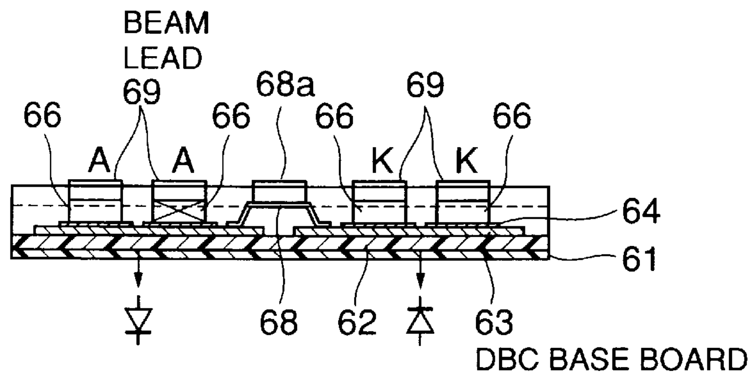
FIG. 7*b* is a front sectional view diagram along the line B—B in FIG. 7*a* of the actual structure of the by-pass diode package shown in FIG. 1 and FIG. 2.
Figure 7C:
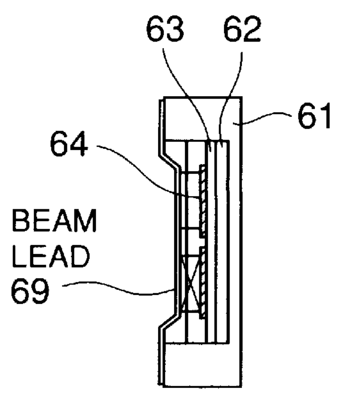
FIG. 7*c* is a side view diagram of the actual structure of the by-pass diode package shown in FIG. 1 and FIG. 2.
Figure 8:
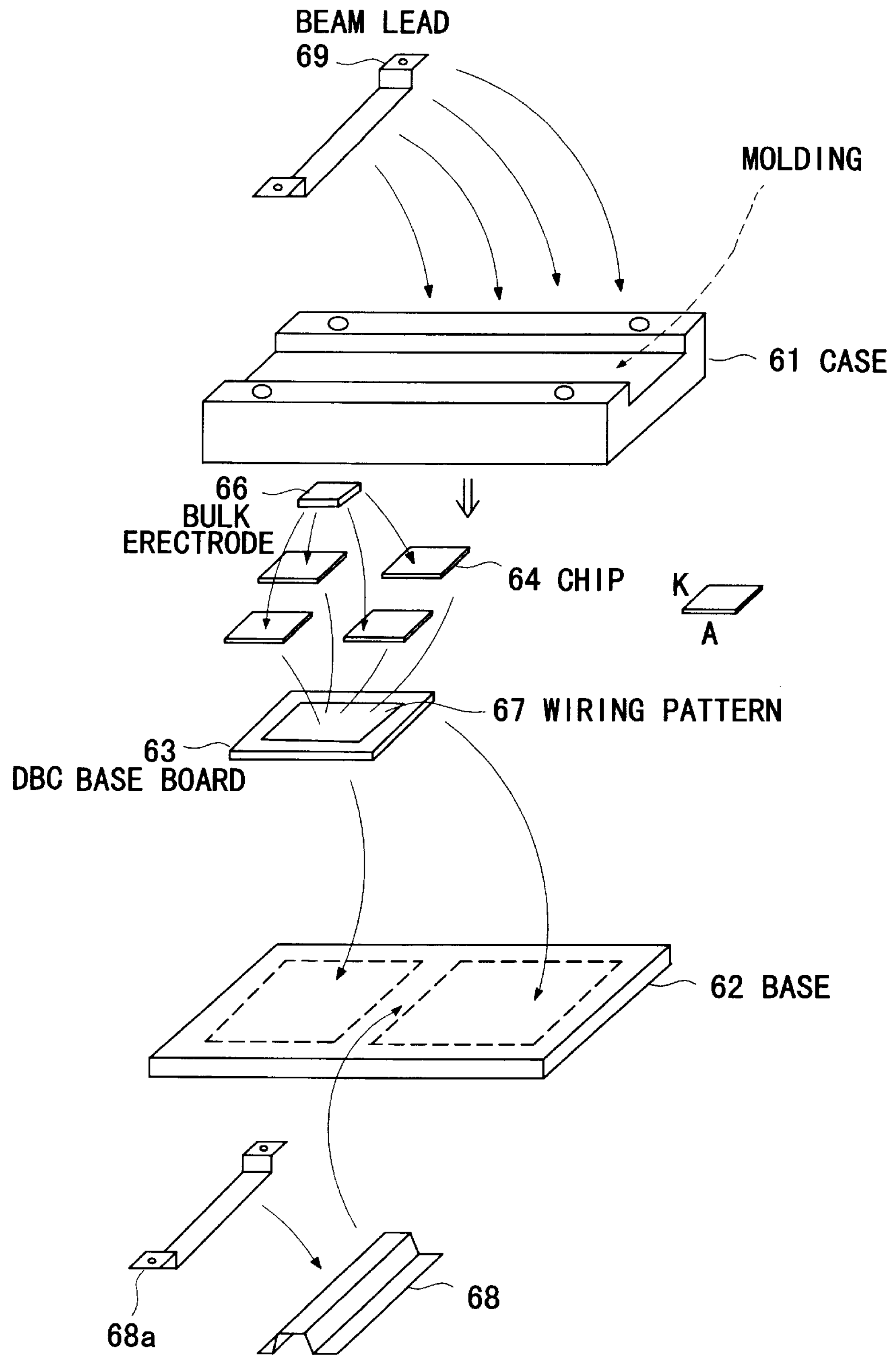
FIG. 8 is an exploded perspective view of the diode package shown in FIG. 7.

FIG. 7 is a diagram for explaining the actual structure of the by-pass diode package 5 or 6 shown in FIG. 1 and FIG. 2, (a) is a plan view and (b) is a front sectional view with the by-pass diode that is cut in the direction of paper surface along the line B—B shown in (a), and (c) is a side view. FIG. 8 is a exploded perspective view of FIG. 7.

A base 62 is housed in the recess of a case 61, two sheets of high voltage resisting DBC board (ceramic wiring plate) 63 made of good thermal conductive aluminum nitride which is formed a wiring pattern 67 are provided on the base 62 at a space between them and soldered. On each DBC board 63, 4 pieces of diode chip 64 comprising the by-pass diodes 5 and 6 shown in FIG. 1 and FIG. 2 are placed and soldered.

In this case, the diode chips 64 to be placed on the DBC board 63 at one side, for instance, at the left side of FIG. 7(*a*) are arranged so that the anode electrode A comes to the upper surface and the diode chips 64 to be placed on the DBC board 63 at the other side, for instance, at the right side of FIG. 7(*b*) are so arranged that the cathode electrode K side comes to the upper surface.

On each of the diode chips 64 thus arranged, a block shape bulk electrode 66 is placed and soldered to the diode chip 64. Further, between the two sheets of DBC pate 63, a wiring pattern connector 68 composed of a beam lead is put and the wiring pattern 67 of both DBC boards 63 are electrically connected. Further, the upper and lower bulk electrodes 66 shown in FIG. 7(*a*) out of the bulk electrodes 66 fixed to the upper part of each diode chip 64 are electrically connected by a beam lead 69 and similarly, between other upper and lower bulk electrodes 66, a beam lead 69 is provided to electrically connect them.

Further, on the top of the wiring pattern connector 68, an intermediate terminal composed of a beam lead 68*a* is placed and fixed. And, the circumference of the diode chip 64 in the housing recess of the case 61 is filled with an epoxy resin molded resin or ceramics (not shown) and the entirety is in the high voltage resistive airtight sealed structure. The by-pass diodes 5, 6 shown in FIG. 1 and FIG. 2 are thus composed.

According to the fifth embodiment, the actions and effects shown below are obtained. One side of the diode chips 64 are soldered to the DBC board 63 and the bulk electrode 66 is soldered to the other anode electrode A and the cathode electrode K of the each diode chips 64 and between the bulk electrodes 66 arranged at the upper and lower positions shown in FIG. 7 (*a*) is connected with the beam lead 69, and therefore, it becomes possible to make inductance low. Further, as the diode chips 64 are placed and fixed on the DBC 63, the cooling effect of the diode chips 64 is increased.

Figure 11:
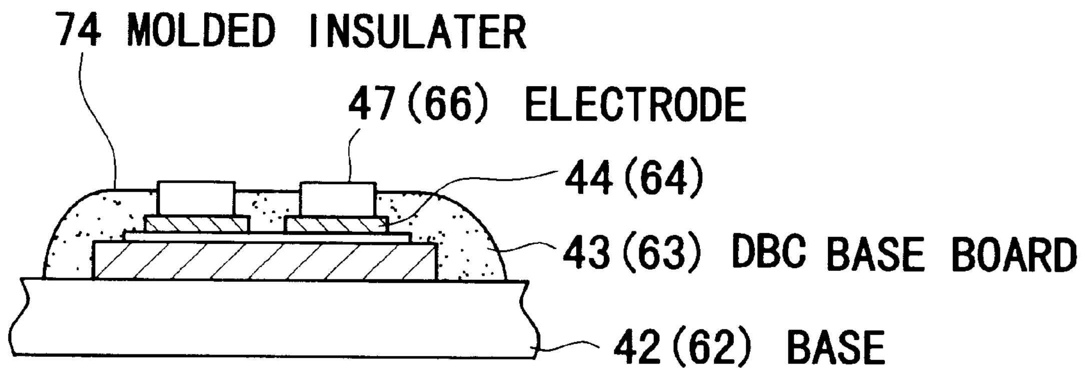
FIG. 11 is a diagram for explaining a method for sealing the power device chips shown in FIG. 1 and FIG. 2, FIG. 13 and FIG. 14.
Figure 12:
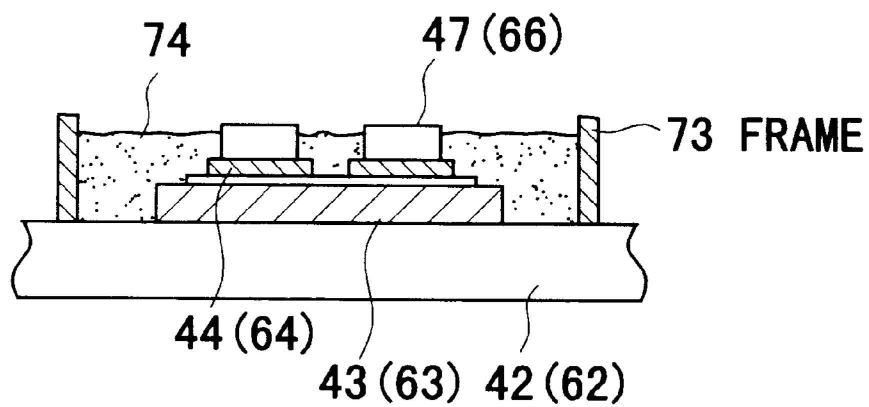
FIG. 12 is a diagram for explaining another method for sealing the power device chip shown in FIG. 1 and FIG. 2, FIG. 13 and FIG. 14.

Further, as the circumference of the diode chips 64 are sealed by molding with epoxy resin, etc., each of the diode chips 64 is certainly insulated, and the diode chips 64 and DBC boards 63 are reinforced. Further, for sealing the device chips 44, either method shown in FIG. 11 or FIG. 12 is usable and further, the case 61 shown in FIG. 8 may be thin package type, if the base is fully strong.

Figure 9:
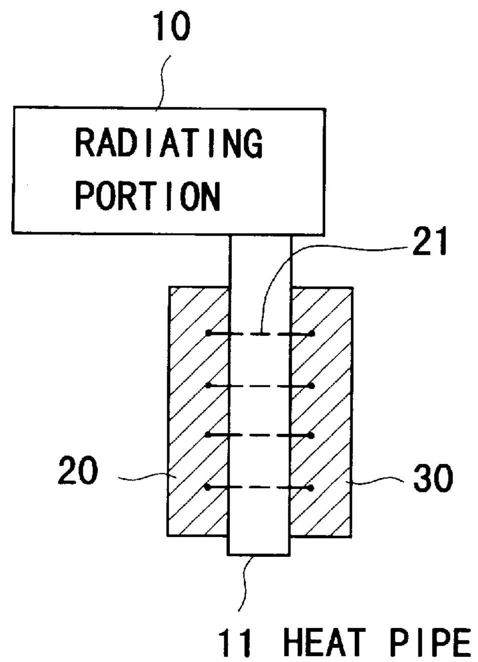
FIG. 9 is a diagram for explaining the structure to increase current capacity of an inverter unit for one phase.
Figure 13:
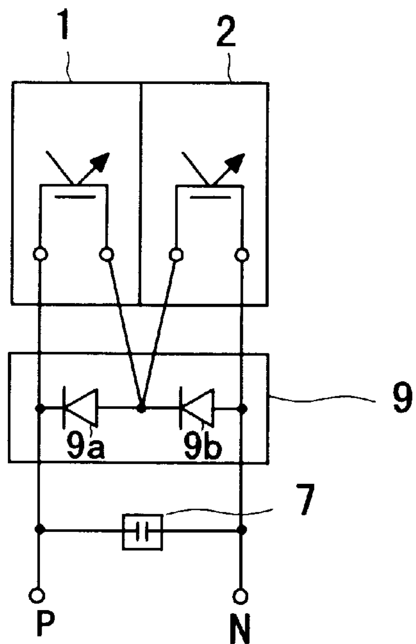
FIG. 13 is a diagram showing the arrangement and the relation of electrical connection of packages for explaining another embodiment of the present invention.

In FIG. 9, in order to increase the current capacity of a single phase inverter unit shown in FIG. 2 or FIG. 13, inverter units 20, 30 shown in FIG. 2 or FIG. 13 are installed to the both sides of the heat pipe 11 that is in one unit with the air-cooled radiator 10 comprising the cooler. Holes for passing a wire 21 to electrically connect the inverter units 20,30 are made on the heat pipe 11, and the wire 21 is passed through these holes. Each power devices is connected in parallel.

As the inverter units 20, 30 are installed on the side planes of the heat pipe 11, respectively in this structure, the cooling effect of the inverter units 20, 30 is improved and it is possible to increase the current capacity and make the entirety in a small size.

Figure 10:
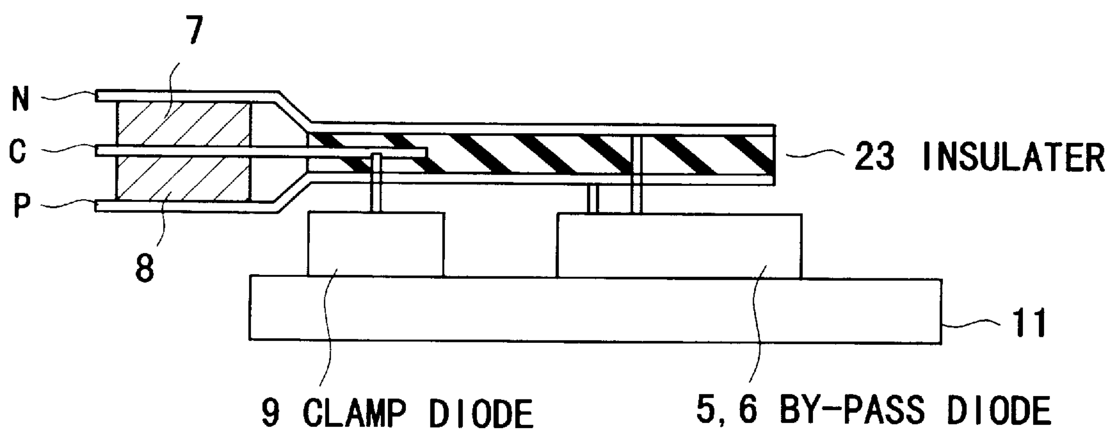
FIG. 10 is a diagram for explaining an air-cooled radiator with untiparallel connected diodes installed to the inverter unit for one phase composed as shown in FIG. 1 and FIG. 2.

Shown in FIG. 10 is the inverter unit capable of obtaining 3 levels of AC output shown in FIG. 1 and FIG. 2 that is made in the structure shown below. An insulator 23 is arranged with interposed at one side of two DC terminal plates P, N and the neutral point terminal C is arranged between the DC terminals P, N at the other side of the DC terminal plates P, N, snubber capacitor chips 7, 8 comprising snubber circuits are arranged between one of the DC terminal plate N and the neutral point terminal C and between the neutral point terminal C and the other DC terminal plate P, the package of clamp diode 9 and the packages of by-pass diode 5, 6 are installed to the heat pipe 11 and the clamp diode 9 and the by-pass diodes 5, 6 are electrically and mechanically connected to the DC terminals P, N and the neutral point terminal C, respectively.

According to the seventh embodiment, the entirety of the snubber capacitors 7, 8, the DC terminals P, N and the neutral point terminal C can be made in the compact size and cooling performance of the clamp diode 9 and the by-pass diodes 5, 6 installed to the heat pipe 11 is improved.

Figure 14:
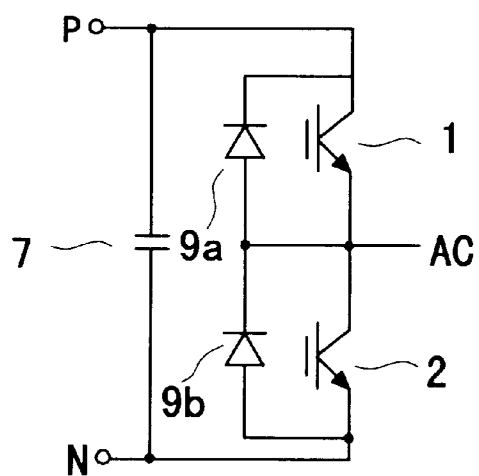
FIG. 14 is a diagram showing the relation of electrical connection shown in FIG. 13.
Figure 15:
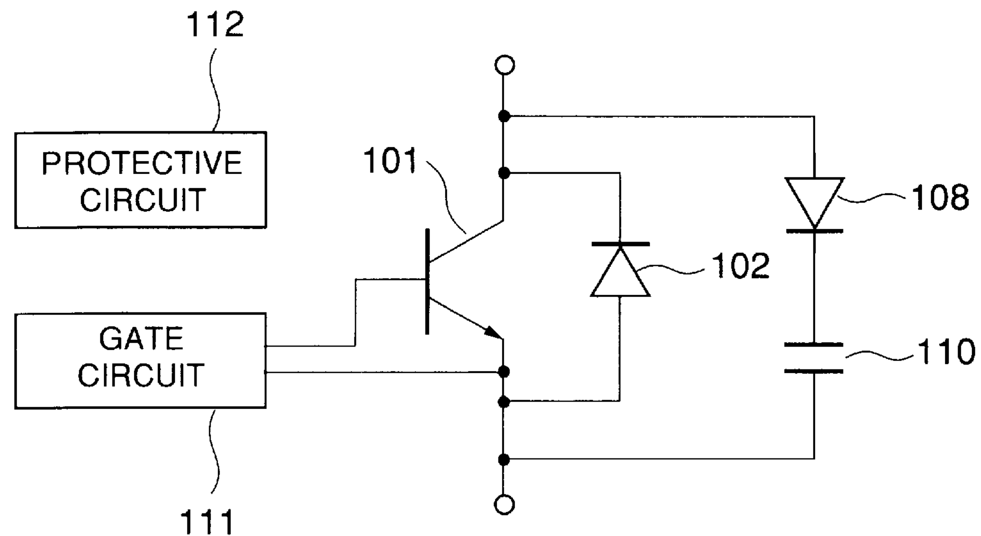
FIG. 15 is a diagram showing the structure of the main circuit of a conventional power conversion system.
Figure 16:
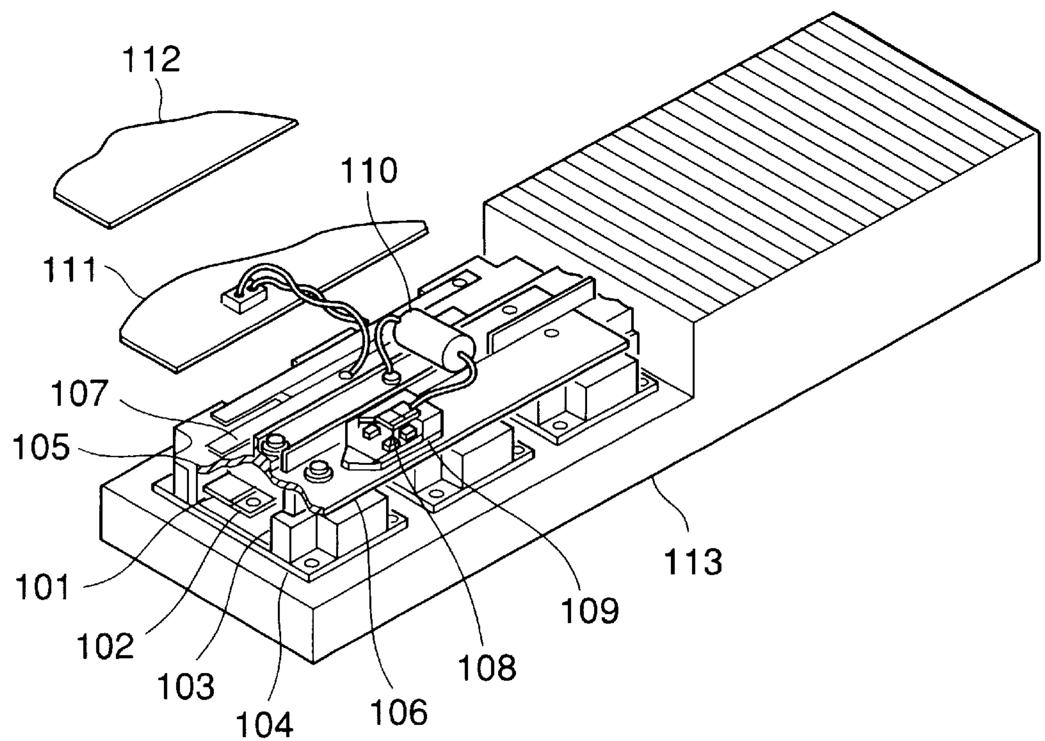
FIG. 16 is a perspective view showing the schematic structure of the power conversion system shown in FIG. 15.

FIG. 11 and FIG. 12 are diagrams for explainingmethods for sealing the power device and diode chips shown in FIG. 2, FIG. 13 and FIG. 14.

In FIG. 11, the DBC board 43 formed the wiring pattern is installed on the base42, the power device chip 44 is soldered to the DBC board 43 and in the state of the chip 44 with the bulk electrode 47 fixed, melted epoxy resin, etc. are dripped in the surrounding groove of the chip 44 and this epoxy resin is hardened to form a molded layer 74. In this case, the bulk electrode 47 is arranged so that it is exposed to the outside of the molded layer 74.

As the insulated and excellently airtight molded layer 74 is formed around the chip 44, the chip 44 and the DBC board 43 can be protected, insulation around the device chip is improved and thus, it becomes possible to make the chip in a compact size.

In this case, to prevent the crack and separation of the molded layer 74, it is desirable to select a molding material so that the coefficient of thermal expansion of the molded layer 74 becomes the same as that of the DBC board 43.

Further, when forming the molded layer 74, the mechanical strength of the molded layer 74 at the end side of the DBC board 43 is increased by applying a compressive force thereto and thus, the DBC board 43 is fully protected.

Further, the power device chip 44 described above also can be sealed in a small area of every DBC board 43.

FIG. 12 shows an example that there is the case 41 as the power device package as shown in FIG. 5. Definitely, this is a method to provide a frame 73 so as to enclose the DBC board 43 on the top of the base 42 and the circumference of the chip 44 is molded by pouring melted epoxy resin into the frame 73 using a pot. In this case, the bulk electrode 47 is also exposed to the outside of the molded layer 74.

Thus, the circumference of the chip 44 can be encircled with the molded layer 74 more certainly than when the frame 73 is not provided as shown in FIG. 11.

In both cases in FIG. 11 and FIG. 12, the wiring is made by the bulk electrode 47 exposed to the outside of the molded layer 74 and therefore, it is possible assembling and wiring of the power device packages without damage.

What is described in the above is regarding the power device chip 44 and this is also applicable to the diode chip 64 shown in FIG. 7 and FIG. 8 and needless to say, they are sealed by molding epoxy resin, etc.

According to the eighth embodiment, insulation around the power device chip 44 or the diode chip 64 is improved and thus,as protection ability of the chip 44 or 64 is improved, it becomes possible to make the system in a compact size.

FIG. 13 is a diagram showing the arrangement and electrical connection of a package of a single phase inverter unit to obtain 3 levels of AC output for explaining the ninth embodiment of the present invention and FIG. 14 is a diagram showing the electrical connection in FIG. 13. Shown in this embodiment is a power conversion system composed by combining a plurality of inverter units for a single phase and capable of obtaining 2 levels of AC output.

The inverter unit is equipped with the device series circuit with the first and the second semiconductor power devices 1, 2 connected in series, the DC terminals P, N connected to both ends of the device series circuit, the series connected clamp diode circuit with the clamp diodes 9*a,* 9*b* connected to the power devices 1, 2 of the device series circuit in parallel, and AC terminal connected to the connecting point of the first and the second power devices 1, 2.

Further, the first and the second device packages comprising the packaged power devices 1, 2, the clamp diode package comprising of the packaged clamp diode 9*a,*9*b* and the first and the second device packages provided in parallel on one of the wall surface of the clamp diode packages are provided. Further, a snubber capacitor 7 is electrically connected between the DC terminals P and N.

According to the ninth embodiment described above, the wiring route mutually connecting the power devices 1, 2, the clamp diodes 9*a,* 9*b* and the snubber capacitor 7 are shortened and as a result, it becomes possible to make inductance low. Further, as the first and the second device packages and the clamp diode package are arranged as shown in FIG. 13, the external shape of the entire system can be made small.

The present invention is not restricted to the above-mentioned embodiments but can be deformed as shown below. In electrically connecting the power devices and diodes shown in FIG. 2 or FIG. 13, a laminated conductor insulated by a thin insulator is put on the power device and diode packages and the power devices and the diodes can be electrically connected with the laminated conductor.

According to the present invention described above, it is possible to provide a power conversion system that is capable of making the length of wiring route from the DC terminals and the neutral point terminals to the power device chips short and inductance low and further, to make a current unbalance between the power device chips small, improve cooling performance and the external shape of the entire system small.

What is claimed is:

1. A power conversion system having multi-chip module, comprising:

device packages having power device chips;

clamp diode packages having clamp diode chips; and by-pass diode packages having by-pass diode chips, wherein said device package with said power device chips includes, an insulated wiring board that has a wiring pattern on which is installed a collector of said power device chip, a base installed on said insulated wiring board, bulk electrodes installed on an emitter of said power device chip, an emitter beam lead arranged on said bulk electrodes, a collector beam lead connected to said wiring pattern in said insulated wiring board, a gate board covering on said emitter beam lead and with penetrating holes formed for penetrating a plurality of gate leads, and a case housing said power device chips said insulated wiring board, said base, said bulk electrodes, said emitter beam lead, said collector beam lead, and said gate board.

2. A power conversion system according to claim 1, wherein the circumferences of said power device chips are sealed with insulating molded resin.

3. A power conversion system having a plurality of semiconductor devices configured to convert DC power into AC power, comprising:

device packages having power device chips;

clamp diode packages having clamp diode chips; and by-pass diode packages having by-pass diode chips, wherein said by-pass diode package comprises an insulated wiring board that has a wiring pattern on which are installed said by-pass diode chips, a base installed on said insulated wiring board, bulk electrodes installed on said by-pass diode chips, a beam lead arranged on said bulk electrodes and connecting between said by-pass diode chips, and a case housing said by-pass diode chips, said insulated wiring board, said base, said bulk electrodes, and said beam lead.

4. A power conversion system according to claim 3, wherein the by-pass diode package comprises two pieces of said by-pass diode chips per set.

5. A power conversion system according to claim 3, wherein the circumferences of said by-pass diode chips are sealed by insulating molded resin.

6. A power conversion system having a plurality of semiconductor devices configured to convert DC power into AC power, comprising:

device packages having power device chips;

clamp diode packages having clamp diode chips;

by-pass diode packages having by-pass diode chips, and cooler formed in one united body of an air-cooled radiator and a heat pipe, wherein said power device packages are installed and fixed orthogonally to said by-pass diode packages and said clamp diode packages are installed and fixed orthogonally to said by-pass diode packages.

7. A power conversion system having a plurality of single-phase inverter units, capable of obtaining 3 levels of AC output, comprising:

said single-phase inverter unit having a device package configured to install series circuits comprising semiconductor power devices connected in series;

plate-shaped DC terminals having positive and negative terminals;

a by-pass diode package configured to install by-pass diode circuits comprising bypass diodes connected in series to each other and in parallel to said semiconductor power devices of said series circuits;

a clamp diode package configured to install clamp diode circuits comprising clamp diodes connected in parallel to said series circuits having a predetermined number of semiconductor power devices;

a neutral point terminal connected to a connecting point of said clamp diodes of said clamp diode circuits;

AC terminal connected to a connecting point of said predetermined semiconductor power devices;

an insulator provided between said positive terminal and negative terminal of said DC terminals; and a cooler contacted on predetermined surfaces of said clamp diode package and said by-pass diode package, wherein said clamp diodes and said by-pass diodes are electrically and mechanically connected to said DC terminals and said neutral point terminal, respectively.

8. A power conversion system according to claim 7, wherein said device packages and said clamp diode packages are arranged and fixed orthogonal to each other.

9. A power conversion system according to claim 1, wherein said device packages and said clamp diode packages are arranged and fixed orthogonal to each other.

10. A power conversion system according to claim 3, wherein said device packages and said clamp diode packages are arranged and fixed orthogonal to each other.

11. A power conversion system including a combination of a plurality of single-phase inverter units, capable of obtaining three levels of AC output, said inverter units comprising:

a device series circuit including a first, second, third, and fourth semiconductor power device packages connected in series;

DC terminals connected to ends of the device series circuit;

a by-pass diode circuit including a first and a second by-pass diode packages connected in series with each other and across said device series circuit;

a clamp diod e package including a first and a second clamp diodes connected in series, said clamp diode package connected across the second and third semiconductor power device packages;

a neutral point terminal connected to a first connecting point between the first and the second clamp diodes; and an AC terminal connected to a second connecting point in common with the second and the third power device packages and the first and second by-pass diode packages, wherein each of said inverter units includes the first, second, third and fourth device packages with packaged power device chips, the clamp diode package includes the neutral point terminal and the first and second clamp diodes, the first and second by-pass diode packages include packaged by-pass diode chips, provided in parallel on one of a wall surface of the clamp diode package, centrally located between said power device packages, and proximate to said clamp diode packages, and said power device packages are provided in parallel on an outside wall surface of the by-pass diode package.

12. A power conversion system according to claim 11, wherein the device package comprises:

an insulated wiring board that has a wiring pattern on which a collector of the power device chip is installed;

a base installed on the insulated wiring board;

bulk electrodes installed on an emitter of the power device chip;

an emitter beam lead arranged on the bulk electrodes;

a collector beam lead connected to a wiring pattern on the insulated wiring board;

a gate board covering the emitter beam lead with penetrating holes to allow penetration of a plurality of gate leads; and a case housing the device package components.

13. A power conversion system according to claim 12, wherein circumferences of the power device chips are sealed with insulating molded resin.

14. A power conversion system according to claim 11, wherein the by-pass diode package comprises:

an insulated wiring board having a wiring pattern on which the by-pass diode chips are installed;

a base installed on the insulated wiring board;

bulk electrodes installed on the by-pass diode chips;

a beam lead arranged on the bulk electrodes and connecting to the by-pass diodes; and a case housing these components.

15. A power conversion system according to claim 14, wherein each of the first and second by-pass diode package comprises two said packaged by-pass diode chips.

16. A power conversion system according to claim 14, wherein circumferences of the packaged by-pass diode chips are sealed by insulating molded resin.

17. A power conversion system according to claim 11, wherein the semiconductor power device packages are installed and fixed orthogonally to the first and second by-pass diode packages and the clamp diode packages are installed and fixed orthogonally to the first and second by-pass diode packages, said power device and clamp diode packages are put on a cooler that is formed in an united body of an air-cooled radiator and a heat pipe.

18. A power conversion system according to claim 11, wherein an insulator is provided at one end of the two DC terminals, the neutral point terminal is provided at the DC terminals at the opposite end of the DC terminals, snubber capacitors comprising a snubber circuit are provided between one of the DC terminals and the neural point terminal and between the neutral point terminal and the remaining DC terminal, the clamp diode package and the first and second by-pass diode packages are installed to the cooler, and the clamp diodes and the first and second by-pass diodes are electrically and mechanically connected to the DC terminals and the neutral point terminal, respectively.

19. A power conversion system according to claim 11, wherein a snubber capacitor is provided between the neutral point terminal and the DC terminal, respectively.

* * * * *